Patented June 16, 1925.

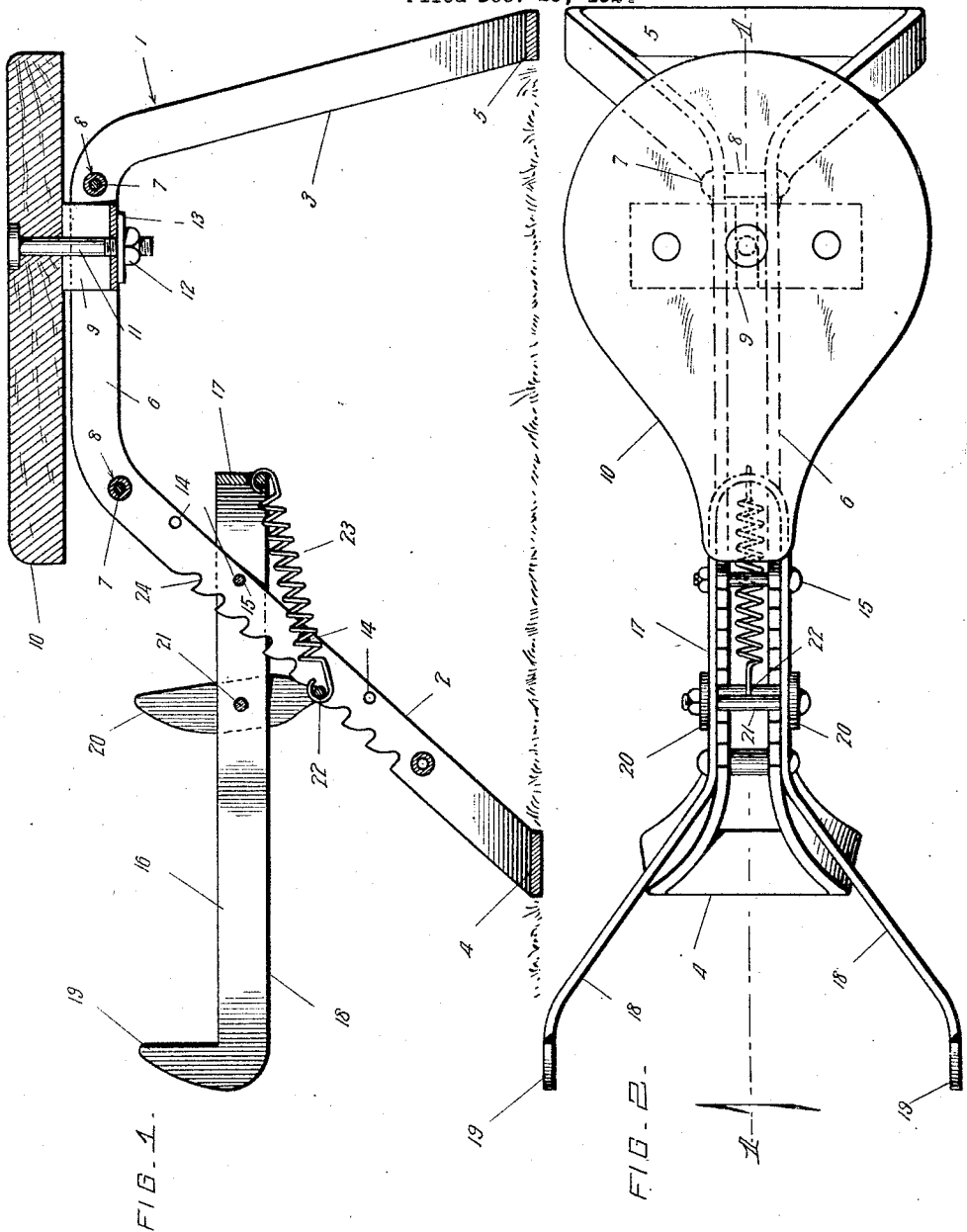

1,542,518

UNITED STATES PATENT OFFICE.

JOHN PETERS, OF MINGO, KANSAS.

MILKING STOOL.

Application filed December 20, 1924. Serial No. 757,219.

*To all whom it may concern:*

Be it known that I, JOHN PETERS, a citizen of the United States, residing at Mingo, in the county of Thomas and State of Kansas, have invented certain new and useful Improvements in Milking Stools, of which the following is a specification.

My invention consists in a new and useful improvement in milking stools and is designed to provide a stool with an adjustable seat and an adjustable pail-holding bracket. The particularly novel and useful features of my improved device are the peculiar design of the supporting structure of the stool and the design of the pail-holding bracket and its relation to the supporting structure.

In the drawing filed herewith I have illustrated one specific embodiment of my invention but it is to be understood that I do not consider my invention limited to the specific embodiment hereinafter fully described but refer for its scope to the claims appended hereto.

In the drawing:

Fig. 1 is a vertical section on the line 1—1 of Fig. 2.

Fig. 2 is a top plan view of my device.

In the drawing the numeral 1 designates a continuous strip of band iron fabricated to form the supporting structure of my stool. This structure is so fashioned that there are provided two V-shaped standards 2 and 3 having base portions 4 and 5. These standards 2 and 3 are somewhat inclined toward one another and connected at their tops by a guideway 6. Bolts 7 with spacing collars 8 bridge this guideway 6 at its ends. Slidably received in the guideway 6 is the U-shaped plate 9 on which is mounted the seat 10. A bolt 11 passes through the seat 10, plate 9, and guideway 6 and receives on its lower end the clamping nut 12 by which the clamping plate 13 surrounding the bolt 11 may be clamped against the under side of the guideway 6, to secure the seat 10 in adjusted position upon the supporting structure.

The standard 2 at the front of the device is provided with a series of holes 14 in any one of which may be mounted the pintle pin 15 upon which is pivotally mounted the bracket 16 formed of a continuous strip of band iron. This bracket 16 has a U-shaped portion 17 enclosing the sides of the standard 2, and a pair of flaring arms 18, each of which is provided at its end with a retaining hook 19.

Pivotally mounted on the portion 17 by a pintle pin 21 are the upstanding fingers 20 connected at their bottoms by a dog 22 connected by a coil spring 23 with the crotch of the portion 17. The forward edge of the standard 2 is provided with ratchets 24 with which the dog 22 co-operates.

From the foregoing description of the structure of my device, its use and operation will be obvious. It is to be noted that by providing several holes 14, the pail-holding bracket 16 may be adjusted at different heights on the standard 2 and also that when the bracket 16 is mounted by the pintle pin 15 it may be fixed in different positions of adjustment about its pivot point. This adjustment is made by the operation of the spring-actuated dog 22 and the ratchet 24. It is also to be noted that as the pail-clamping fingers 20 are pivoted to the bracket 16 they are adapted to clamp upon the bracket 16 pails of different diameters and their clamping action is secured by the spring-actuated dog 22.

Having described my invention, what I claim is:

1. In a milking stool, the combination of a supporting structure; a pail-holding bracket adjustably pivoted on said structure; pivoted pail-clamping fingers on said bracket; a dog connecting said fingers; a ratchet on said structure with which said dog co-acts; and a spring connecting said bracket and dog and adapted to operate said fingers and said dog.

2. In a milking stool, the combination of a supporting structure; a pail-holding bracket pivoted on said structure and provided with means adapted to clamp pails of varying diameter on said bracket; and means adapted to automatically adjust said bracket relative to said structure, and said clamping means relative to a pail on said bracket.

In testimony whereof I affix my signature.

JOHN PETERS.